United States Patent
Wampler et al.

(10) Patent No.: US 12,482,056 B2
(45) Date of Patent: Nov. 25, 2025

(54) LOCAL DEFORMATION FOR INTERACTIVE SHAPE EDITITING

(71) Applicant: ADOBE INC., San Jose, CA (US)

(72) Inventors: Kevin John Wampler, Seattle, WA (US); Honglin Chen, San Jose, CA (US)

(73) Assignee: ADOBE INC., San Jose, CA (US)

( * ) Notice: Subject to any disclaimer, the term of this patent is extended or adjusted under 35 U.S.C. 154(b) by 377 days.

(21) Appl. No.: 18/224,946

(22) Filed: Jul. 21, 2023

(65) Prior Publication Data

US 2025/0029203 A1  Jan. 23, 2025

(51) Int. Cl.
| | |
|---|---|
| *G06T 3/18* | (2024.01) |
| *G06T 3/02* | (2024.01) |
| *G06T 13/20* | (2011.01) |
| *G06T 17/20* | (2006.01) |
| *G06T 19/20* | (2011.01) |

(52) U.S. Cl.
CPC ............... *G06T 3/18* (2024.01); *G06T 3/02* (2024.01); *G06T 13/20* (2013.01); *G06T 17/20* (2013.01); *G06T 17/205* (2013.01); *G06T 19/20* (2013.01); *G06T 2200/24* (2013.01)

(58) Field of Classification Search
CPC .. G06T 3/18; G06T 3/02; G06T 13/20; G06T 17/20; G06T 17/205; G06T 19/20; G06T 2200/24
See application file for complete search history.

(56) References Cited

U.S. PATENT DOCUMENTS

| | | | |
|---|---|---|---|
| 9,053,553 B2* | 6/2015 | Popovi ...................... | G06T 3/18 |
| 2017/0098326 A1* | 4/2017 | Wampler .................. | G06T 3/02 |
| 2018/0130256 A1* | 5/2018 | Wampler ................ | G06T 19/20 |

* cited by examiner

*Primary Examiner* — King Y Poon
*Assistant Examiner* — Vincent Peren
(74) *Attorney, Agent, or Firm* — Shook Hardy & Bacon L.L.P.

(57) ABSTRACT

Systems and methods provide local deformation for shapes. In accordance with some aspects, input to deform a shape is received. The shape comprises a plurality of vertices with each vertex having a vertex position. Based on the input, deformed vertex positions are determined for the plurality of vertices by minimizing an energy function that includes an elastic energy term and a regularization term that is a function of vertex position change for each vertex having a vertex position change below a threshold and a constant for each vertex having a vertex position change above the threshold. A deformed shape is generated based on the deformed vertex positions.

20 Claims, 15 Drawing Sheets
(11 of 15 Drawing Sheet(s) Filed in Color)

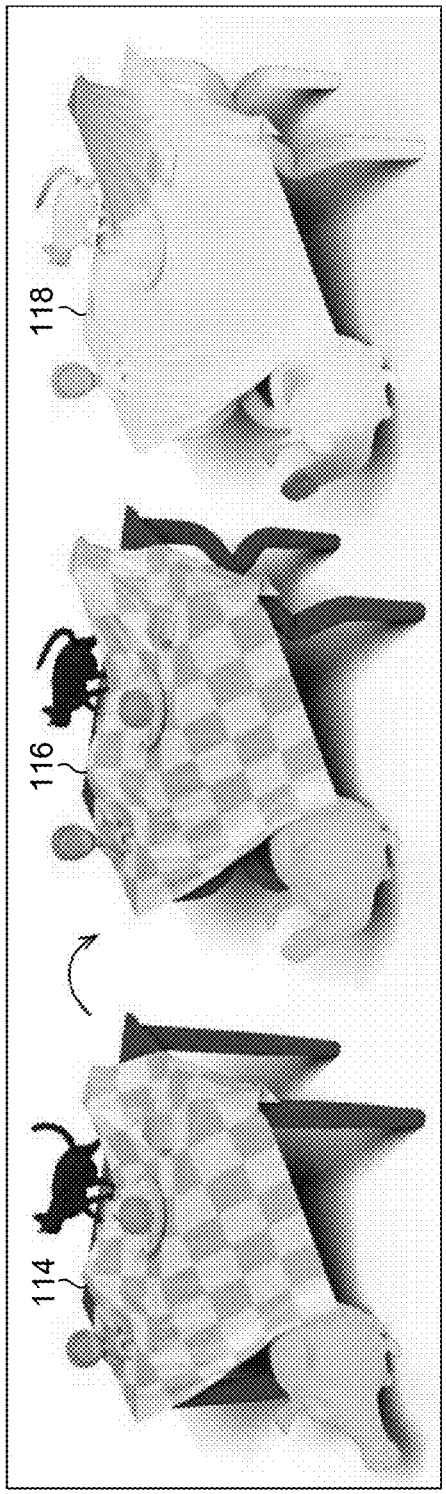
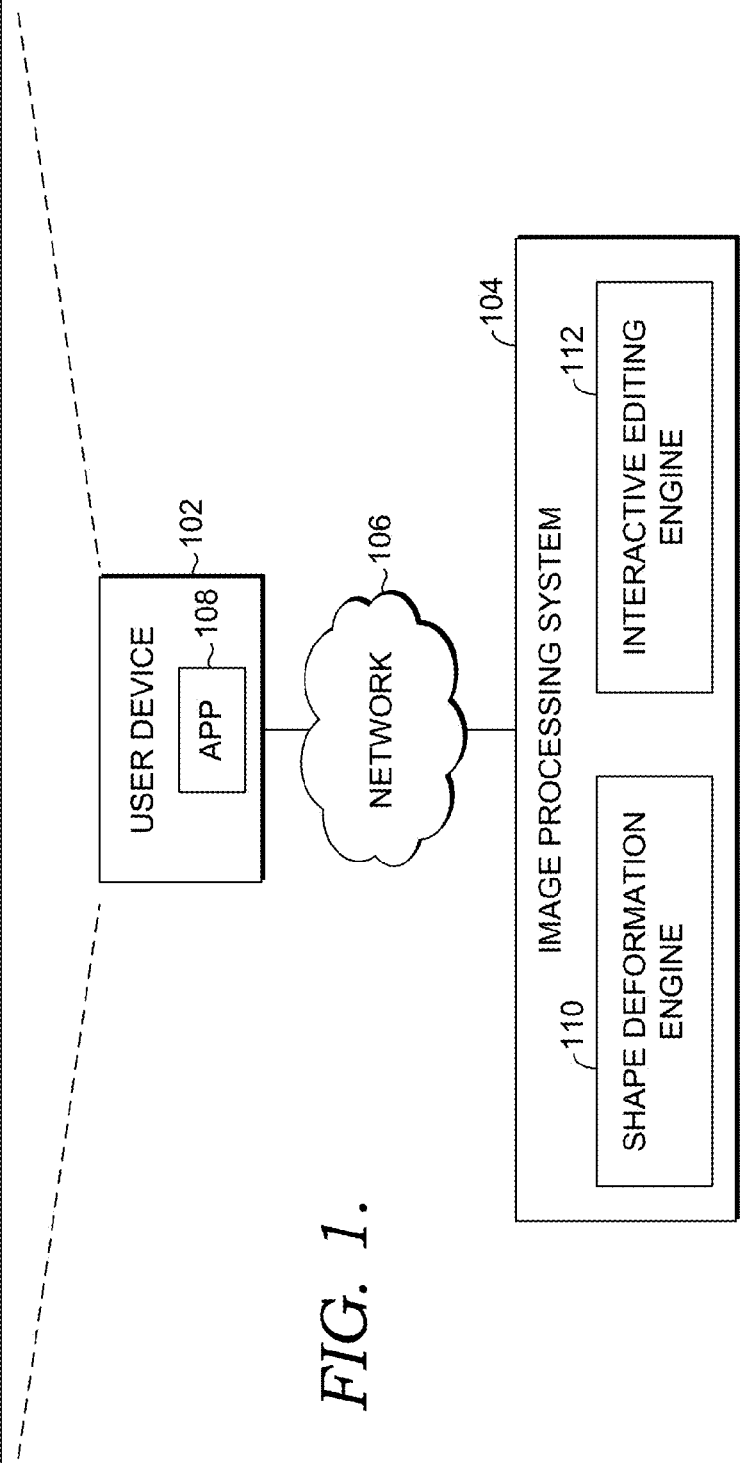
FIG. 1.

LOCAL DEFORMATION FOR INTERACTIVE SHAPE EDITITING

BACKGROUND

Local deformation is a core component in modeling and animation. The goal of localized deformation is to deform a shape such that only the parts of the shape near where the user is currently manipulating move while everything else stays still, ensuring that the user can focus entirely on one region of the shape without worrying about inadvertent changes elsewhere. However, existing localized deformation tools tend to have practical impediments for interactive design: they are too slow to run, unaware of the geometry, introduce artifacts, or require a careful control point setup.

SUMMARY

Some aspects of the present technology relate to, among other things, an image processing system that performs local deformations for shape editing. The image processing system provides for local shape deformations using an energy function that comprises an elastic energy term and a regularization term referred to herein as a "bird loss". The elastic energy term can comprise various forms of elastic energy for global deformation. The regularization term is a per-vertex function based on vertex position change. For vertices having a vertex position change below a threshold, the bird loss regularization term is a function of vertex position change; while for vertices having a vertex position change above the threshold, the bird loss regularization term is a constant. Based on this design, when the vertex position change for a vertex is below the threshold, the bird loss regularization term causes the deformed vertex position of the vertex to be pulled back towards its rest position. Conversely, when the vertex position change for a vertex is above the threshold, the bird loss regularization term does not impact the deformed vertex position. In operation, when a shape and input to deform the shape is received, the image processing system determines deformed vertex positions by minimizing the energy function, and a deformed shape is generated based on the deformed vertex positions.

Some aspects of the technology described herein employ a three-block alternating direction method of multiplies (ADMM) approach to minimize the energy function, which provides for real-time local deformation of the shape. The three-block ADMM approach includes two local steps followed by a global step. The first local step solves for the elastic energy term of the energy function. The second local step solves for the bird loss regularization term. The global step updates the vertex positions of the shape based on the elastic energy term from the first local step and the regularization term from the second local step. This process is iterated until convergence.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present technology is described in detail below with reference to the attached drawing figures, wherein:

FIG. 1 is a block diagram illustrating an exemplary system in accordance with some implementations of the present disclosure;

DETAILED DESCRIPTION

Overview

Figure 2:
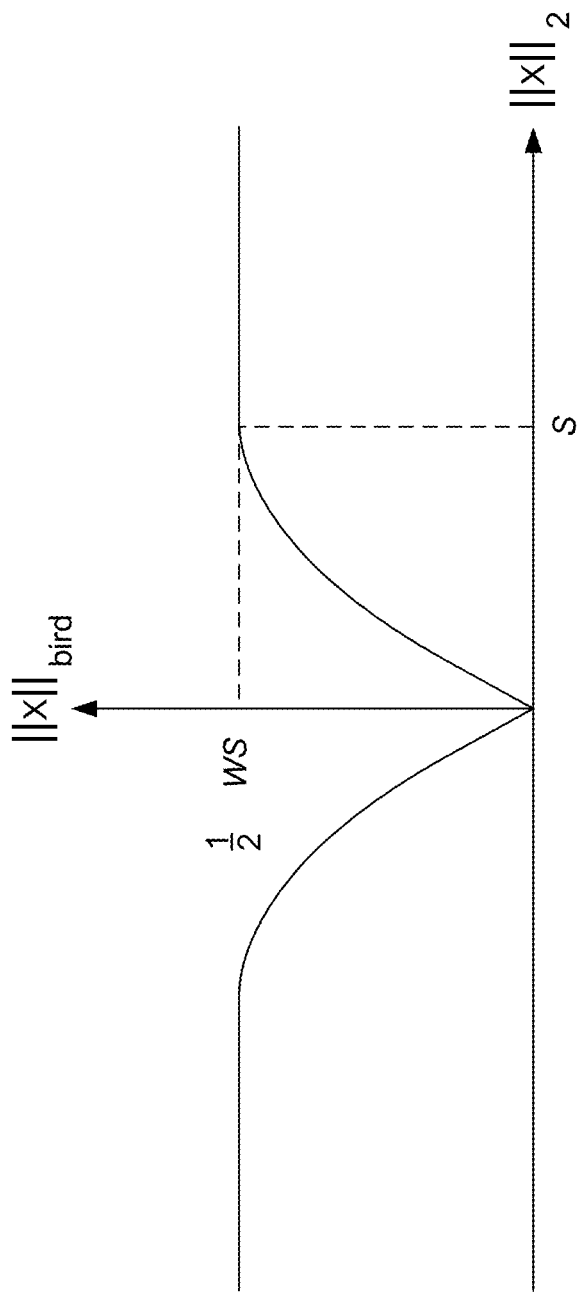
FIG. 2 is a diagram illustrating a bird loss function in accordance with some implementations of the present disclosure.

Conventional shape deformation algorithms in computer graphics have typically fallen into one of two categories, referred to herein as: (1) a direct approach; and (2) an optimization approach. In the direct approach, the shape's deformation is an explicit function of the user's input, often either by modifying some high-level parameterization or by applying a pre-specified deformation field. In the optimization approach, the shape deformation is an indirect product of the user's input combined with an elastic energy, and the deformation itself is only known after an optimization process has converged to minimize this energy. These two approaches differ in how (and often whether) they enforce the locality of a deformation.

Locality in High-Level Parameterizations. One conventional approach for localized deformation is the direct manipulation of high-level parameters. From the onset, a notion of locality is baked into these parameters, which can directly encode the shape itself, often using splines or a "rig" to control a shape's deformation, as with cage-based generalized barycentric coordinates, linear-blend skinning, lattice deformers, wire curves, or learned skinning weights, to list a few. Approaches of this nature have a few disadvantages. Firstly, since the locality is baked into the parameterization, it cannot easily adapt based on changes in the deformation. Secondly, without an optimization step even in cases where a capable elastic energy is within reach, there is no way to incorporate it into the deformation.

Locality in Deformation Fields. Instead of providing localized deformation via pre-chosen parameters, another previous deformation approach is to define a localized deformation field, then apply it to a shape. These methods often follow a "sculpting" metaphor, and include simple move, scale, pinch, and twist edits as well as more sophisticated operations. One particularly approach introduced regularized Kelvinlets, which provides real-time localized volumetric control based on the regularized closed-form solutions of linear elasticity. These closed-form solutions have been extended to handle dynamic secondary motions, sharp deformation, and anisotropic elasticity. These approaches allow for local deformation with real-time feedback. However, as they are designed for digital sculpting, these methods usually require the user to explicitly pick the falloff of the brushes. Furthermore, these methods are usually based on Euclidean distance, unaware of the shape's geometry.

Localized Optimization via Enforcing a Region of Influence (ROI). One natural formulation of optimization-based deformation editing is by solving globally for the entire shape's deformation at once. Nevertheless, there are methods attempting to enforce locality in the shape optimization process. Previous methods of this sort have often computed the ROI of a manipulation as a preprocessing step, then restricting the optimization to only move parts of the shape within this ROI. The ROI can be taken as an input or based on a small amount of user markup. Other previous methods combine deformation energies with handle-based systems, including skeleton rigs. Unfortunately, in many contexts, the ROI is hard or impossible to know in advance. This is particularly the case when constraints are involved, or where it is not known in advance if a deformation will be small (best fitting a small ROI) or large (best fitting a large ROI). In addition, the correct ROI may also depend on the elastic energy driving the deformation, thus difficult to account for when the ROI calculation is decoupled in a separate step.

Localized Optimization via Sparsity Norms. To allow an adaptive ROI while preserving the benefits of optimization-based deformation, some previous deformation approaches have adopted a sparsity-inducing norm, typically a $\|x\|_1$ or $\|x\|_2$ norm, in their energy, which is then minimized by Alternating Direction Method of Multipliers (ADMM) or Augmented Lagrangian Method (ALM). Several methods of this variety rely on sparsity-inducing norm formulated as a sum of $\|x\|_2$ norms, referred to as $\ell_{2,1}$ or $\ell_1/\ell_2$ norms, or a group lasso penalty. They have been applied in a preprocessing phase to compute sparse deformation modes for interactive local control. However, the deformation is limited by the linear deformation modes and thus struggles with large deformation.

Another class of previous deformation methods adds a sparsity-induced regularization to an elastic energy optimization to achieve local deformation. For instance, one previous approach applied different $\ell_p$ sparsity norms to the as-rigid-as-possible (ARAP) energy to create various deformation styles. Another previous approach used $\ell_{2,1}$ regularization on vertex positions to locally control the deformation. However, this approach's direct use of the $\ell_{2,1}$ norm creates artifacts when the control point is not on the boundary of the shape. Moreover, this method requires one ADMM solve in each global iteration, which renders the optimization less efficient and slow in runtime. Also, the framework is limited to 2D deformation with ARAP energy only.

Aspects of the technology described herein improve the functioning of the computer itself by providing an image processing system that provides local shape deformation using an approach that addresses these shortcomings in existing local shape deformation technologies. In some aspects, the image processing system employs a regularizer, referred to herein as a "bird loss", which augments an elastic energy with a notion of locality. In further aspects, the image processing system enables real-time localized deformation with an ADMM-based optimization algorithm for bird loss-regularized deformation.

In accordance with some aspects of the technology described herein, a shape to be deformed is received as input. The shape comprises a number of vertices with each vertex having a rest position in the initial shape. The shape can be, for instance, a triangle mesh, a tetrahedral mesh, or a 1D polyline. Input to deform the shape is also received. Given the shape and input to deform the shape, deformed vertex positions are determined. The deformed vertex positions are determined by minimizing an energy function that includes an elastic energy term and a bird loss regularization term, and a deformed shape is generated based on the deformed vertex positions. The bird loss regularization term is a per-vertex function based on vertex position change between the rest position and the deformed vertex position for each vertex. More particularly, the bird loss regularization term is a function of vertex position change for any vertex having a vertex position change below a threshold. For any vertex having a vertex position change above the threshold, the bird loss regularization term is a constant. In this way, when the vertex position change for a vertex is below the threshold, the bird loss regularization term causes the deformed vertex position of the vertex to be pulled back towards its rest position. Conversely, when the vertex position change for a vertex is above the threshold, the bird loss regularization term does not impact the deformed vertex position.

In accordance with further aspects of the technology described herein, a three-block ADMM approach is used to minimize the energy function to provide for real-time local deformation of a shape. The three-block ADMM approach includes two local steps followed by a global step. The first local step solves for the elastic energy term of the energy function. The second local step solves for the bird loss regularization term. The global step updates the vertex positions of the shape based on the elastic energy term from the first local step and the regularization term from the second local step. This process is iterated until convergence.

Aspects of the technology described herein provide a number of improvements over existing local deformation technologies. For instance, use of the bird loss regularization provides an effective and simple-to-implement approach for localizing an elastic energy driven deformation to only those regions of a shape being manipulated by a user. The region of influence induced by the technology described herein naturally adapts to the geometry of the shape, the size of the deformation, and the elastic energy being used. Furthermore, the bird loss regularization is generic enough to be applied to a wide range of shapes and elastic energies (including 1D, 2D, 3D and cloth finite element deformation), and is fast enough to be used in real-time. The technology described herein also offers several benefits for shape manipulation: it avoids undesired movement in far-off regions of a shape when only one part is being moved by the user; it allows parts of a shape to be deformed with direct manipulation without a pre-rigging step; and avoids the visual artifacts of previous local deformation approaches.

Example System for Local Shape Deformation

With reference now to the drawings, FIG. 1 is a block diagram illustrating an exemplary system 100 for performing local deformations on shapes in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, various functions can be carried out by a processor executing instructions stored in memory.

The system 100 is an example of a suitable architecture for implementing certain aspects of the present disclosure. Among other components not shown, the system 100 includes a user device 102 and an image processing system 104. Each of the user device 102 and image processing system 104 shown in FIG. 1 can comprise one or more computer devices, such as the computing device 1500 of FIG. 15, discussed below. As shown in FIG. 1, the user device 102 and the image processing system 104 can communicate via a network 106, which can include, without limitation, one or more local area networks (LANs) and/or wide area networks (WANs). Such networking environments are commonplace in offices, enterprise-wide computer networks, intranets, and the Internet. It should be understood that any number of user devices and server devices can be employed within the system 100 within the scope of the present technology. Each can comprise a single device or multiple devices cooperating in a distributed environment. For instance, the image processing system 104 could be provided by multiple server devices collectively providing the functionality of the image processing system 104 as described herein. Additionally, other components not shown can also be included within the network environment.

The user device 102 can be a client device on the client-side of operating environment 100, while the image processing system 104 can be on the server-side of operating environment 100. The image processing system 104 can comprise server-side software designed to work in conjunction with client-side software on the user device 102 so as to implement any combination of the features and functionalities discussed in the present disclosure. For instance, the user device 102 can include an application 108 for interacting with the image processing system 104. The application 108 can be, for instance, a web browser or a dedicated application for providing functions, such as those described herein. This division of operating environment 100 is provided to illustrate one example of a suitable environment, and there is no requirement for each implementation that any combination of the user device 102 and the image processing system 104 remain as separate entities. While the operating environment 100 illustrates a configuration in a networked environment with a separate user device 102 and image processing system 104, it should be understood that other configurations can be employed in which components are combined. For instance, in some configurations, the user device 102 can provide some or all of the capabilities of the image processing system 104 described herein.

The user device 102 comprises any type of computing device capable of use by a user. For example, in one aspect, the user device comprises the type of computing device 1500 described in relation to FIG. 15 herein. By way of example and not limitation, the user device 102 can be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device where notifications can be presented. A user can be associated with the user device 102 and can interact with the image processing system 104 via the user device 102.

As will be described in further detail below, the image processing system 104 uses a novel regularization term to produce local deformation on a shape with a dynamic region of influence (ROI). The image processing system takes a shape (e.g., a triangle/tetrahedral mesh of 1D polyline) as input and outputs a deformed shape where the deformation is both local and natural and the ROI is automatically adaptive to the deformation. Here, the "locality" implies that a handle only dominates its nearby areas without affecting the regions far away. For instance, FIG. 1 illustrates a shape 114 that is deformed by the image processing system 104 to generate a deformed shape 116. The image processing system 104 enables the user to edit the shape 114 in an interactive and physically plausible way. The edit is local, meaning that the user can focus on one region of the shape 114 without worrying about inadvertent changes elsewhere. To visualize the locality, colormap 118 highlights in red the regions where the vertex displacement is larger than $10^{-3}$.

As shown in FIG. 1, the image processing system 104 includes a shape deformation engine 110 and an interactive editing engine 112. The components of the image processing system 104 can be in addition to other components that provide further additional functions beyond the features described herein. The image processing system 104 can be implemented using one or more server devices, one or more platforms with corresponding application programming interfaces, cloud infrastructure, and the like. While the image processing system 104 is shown separate from the user device 102 in the configuration of FIG. 1, it should be understood that in other configurations, some or all of the functions of the image processing system 104 can be provided on the user device 102.

In one aspect, the functions performed by components of the image processing system 104 are associated with one or more applications, services, or routines. In particular, such applications, services, or routines can operate on one or more user devices, servers, can be distributed across one or more user devices and servers, or be implemented in the cloud. Moreover, in some aspects, these components of the image processing system 104 can be distributed across a network, including one or more servers and client devices, in the cloud, and/or can reside on a user device. Moreover, these components, functions performed by these components, or services carried out by these components can be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 100, it is contemplated that in some aspects, functionality of these components can be shared or distributed across other components.

Given a shape, such as the shape 114, the shape deformation engine 110 of the image processing system 104 generates a deformed shape, such as the deformed shape 116. The shape can be, for instance, a triangle mesh, tetrahedral mesh, or 1D polyline, that comprises a number of vertices. Given the vertex positions in the input shape (referred to herein as rest vertex positions or rest positions), the shape deformation engine 110 determines deformed vertex positions to generate the deformed shape. In accordance with the technology described herein, the shape deformation engine 110 employs an elastic energy with a sparsity-inducing regularization term to produce natural local deformation. This regularizer is applied per-vertex to $V_i$-$\tilde{V}_i$ to bias each vertex deformed position $V_i$ to match its initial rest position $\tilde{V}_i$ except in isolated regions of the shape.

Previous approaches have enforced sparsity with an $\ell_1$-norm, or with a group lasso/sum-of-norms regularization defined as $\Sigma_i \|V_i\|_2$. However, direct use of a group lasso regularization term leads to artifacts, due to the fact that the group $\ell_1$-norm competes with the elastic energy by dragging all the vertices towards their rest positions. This results in undesired distortion near the deformation handles (see FIGS. 4 and 5, discussed in further detail below), making the deformed region look unnatural. Previous $\ell_1$-based methods focus specifically on ARAP-like deformation, and attempt to alleviate this artifact by adding a Laplacian smoothness term and a weighting term based on biharmonic distance. However, artifacts can arise in regions quite close to the deformation handles, and there is not necessarily any setting of these parameters which alleviates these artifacts without oversmoothing the entire deformation.

In contrast to prior work, the shape deformation engine 110 uses a novel clamped version of the group $\ell_1$-norm as a locality-inducing loss. This modified norm only penalizes the region where the vertex position change is less than a threshold. The norm is referred to herein as a "bird loss"

because the shape of this function resembles the shape of a bird. For instance, FIG. 2 provides an example of the bird loss function in accordance with some embodiments. As illustrated in FIG. 2, the bird loss is a function of vertex position change for vertices having a vertex position change below a threshold s while being a constant for vertices having a vertex position change above the threshold. In some configurations (such as that shown in FIG. 2), the bird loss employs a quadratic function to provide a smooth transition around the threshold.

By way of example only and not limitation, in accordance with some aspects of the technology described herein, the bird loss function is defined as:

$$\|x\|_{bird} = \begin{cases} w\|x\|_2 - \dfrac{w}{2s}\|x\|_2^2 & \|x\|_2 < s \\ \dfrac{1}{2}ws & \|x\|_2 \geq s \end{cases}, \quad (1)$$

where s is the threshold distance beyond which the regularizer is disabled and w is a slope factor that controls the slope at the central vertex of the bird loss function. This function is continuously differentiable and piecewise smooth, and admits a proximal shrinkage operator free of local minima. Near the origin, the bird loss function acts like the group $\ell_1$-norm, which drives $\|x\|_{bird}$ towards 0. When $\|x\|_2 \geq s$, the bird loss function value is a constant and has no penalty on $\|x\|_2$. In accordance with various aspects of the technology described herein, the threshold s and the slope are configurable w. The value of the threshold s dictates the extent of vertex position change required before the bird loss has no penalty, while the value of the slope factor w dictates the extent to which the bird loss pulls a vertex back to its rest position.

It should be noted that the specific bird loss function in Eq. 1 is provided by way of example only and not limitation. The bird loss function can take other forms within the scope of embodiments of the present technology in which the bird loss is a function of vertex position change for vertices having a vertex position change below a threshold while being a constant for vertices having a vertex position change above the threshold. In the embodiment of Eq. 1, the bird loss comprises a quadratic function for vertices having a vertex position change below the threshold. Use of a quadratic function smooths the transition from the function to the constant at the threshold, thereby helping to smooth deformations in the deformed shape. However, other functions, such as a linear function, could be employed.

The shape deformation engine 110 employs the bird loss function as a regularization term in conjunction with an elastic energy to determine deformed vertex positions and generate a deformed shape. As used herein, V denotes a $|V| \times d$ matrix of vertex positions at the deformed state, and $\tilde{V}$ denotes a $|V| \times d$ matrix containing rest state vertex positions. The shape deformation engine 110 determines deformed vertex positions using a total energy function for local deformation as follows:

$$\underset{V}{\text{minimize}}\ \underbrace{E(V)}_{\text{Elasticity}} + \underbrace{\sum_{i \in V} \lambda a_i \|V_i - \tilde{V}_i\|_{bird}}_{\text{Locality}}, \quad (2a)$$

$$\text{s.t.}\ V_s = p_s,\ (\text{position constraint}) \quad (2b)$$

$$A_k V_t = b_k,\ \forall\, t \in S_k\ (\text{affine constraint}) \quad (2c)$$

As shown in Eq. 2, the energy function includes an elastic energy term (i.e., the first term) and a regularization term based on the bird loss function (i.e., the second term). The energy function can comprise any elastic energy of choice, and can be selected independent of the locality regularization. By way of example only and not limitation, the elastic energy term can comprise as-rigid-as-possible (ARAP) energy, a physics-based elastic energy (e.g., Neo-Hookean energy), or as-conformal-as-possible (ACAP) energy, to name a few. The regularization term is the "bird loss" term on the vertex position changes, which measures the locality of the deformation. In the regularization term, lambda is a penalty term and $\alpha_i$ is the barycentric vertex area of the he i-th vertex, which ensures the consistency of the result across different mesh resolutions for the same A. To enable more user control, position constraints and optional affine constraints can be added on selected vertices to achieve different deformation effects. In Eq. 2, s denotes the indices of the vertices with the position constraint. In some instances, these vertices are referred to as "handles". $S_k$ is the k-th set of vertex indices where an affine constraint is added. For simplicity, the position constraints and affine constraints are omitted in the discussion below, as they can be easily integrated to the system by removing the corresponding degrees of freedom and using Lagrange multiplier method.

The energy function from Eq. 2 can be rewritten as:

$$\underset{V,\{X_j\}}{\text{minimize}} \underbrace{\sum_j E(X_j)}_{\text{Elasticity}} + \underbrace{\sum_{i \in V} \lambda a_i \|V_i - \tilde{V}_i\|_{bird}}_{\text{Localness}} \quad (3a)$$

$$\text{s.t. } X_j = sym(D_j V), \forall j, \quad (3b)$$

where $D_j$ is the selection matrix for edges of the j-th vertex or element. sym(F) denotes the symmetric factor S computed using the polar decomposition F=RS, where F is the deformation gradient. Thus, $X_j$ is the symmetric factor of deformation gradient of the j-th vertex or element. (Note that in general $$sym(F) \neq \frac{1}{2}(F + F^T)).$$

The goal of using sym( ) here is to ensure the local coordinates $X_j$ are invariant to rotations as well as translations.

Given a shape and input to deform the shape (e.g., position constraint(s), affine constraints, etc.), the shape deformation engine 110 determines deformed vertex positions by minimizing the energy function, for instance, using alternating direction method of multipliers (ADMM) or augmented Lagrangian method (ALM). One way to minimize the energy function is to use ADMM for the regularization term, and to use a local-global update strategy for the elasticity term. Previous $\ell_1$-based methods apply these two strategies separately in their local and global steps, resulting in an inefficient optimization scheme.

In accordance with some aspects of the technology described herein, the shape deformation engine 110 efficiently minimizes the energy function in Eq. 3 using a three-block ADMM scheme. The three-block ADMM scheme comprises iteratively: performing a first local step to solve for the elastic energy term; performing a second local step to solve for the bird loss regularization term; and performing a global step that updates the vertex positions of the shape based on the elastic energy term from the first local step and the regularization term from the second local step. The first local step can comprise finding the optimal symmetric factor $X_i$ of the deformation gradient, which can be formulated as a minimization problem on the singular values. The second local step can comprise minimizing the bird loss regularization term for each $Z_i$, which can be solved using a shrinkage step. The global step comprises updating vertex positions V, which can be achieved by solving a linear system. An overview of the three-block ADMM scheme is provided below in Algorithm 1.

---

ALGORITHM 1: Three-block ADMM Overview

Input: A triangle or tetrahedral mesh $\tilde{V}, T$
Output: Deformed vertex positions V
    $V \leftarrow \tilde{V}$
    While not converged do
|     $X_i \leftarrow$ local_step_X(V, $\tilde{V}$)     ▷ local step 1
|     $Z_i \leftarrow$ local_step_Z(V, $\tilde{V}$)     ▷ local step 2
|     $V \leftarrow$ global_step($X_i, Z_i, \tilde{V}$)     ▷ global step
|     $U_i \leftarrow$ dual_update($Z_i, V_i, \tilde{V}$)     ▷ dual update 1
|     $W_i \leftarrow$ dual_update($X_i, V_i, \tilde{V}$)     ▷ dual update 2
    end

---

As previously noted, the shape deformation engine 110 can use a variety of different elastic energies as the elastic energy term of the energy function in conjunction with the bird loss regularization term to determine deformed vertex positions. The following discussion provides a number of examples of elastic energies for illustration purposes only.

Local ARAP Energy: The following illustrates how to minimize an as-rigid-as-possible (ARAP) energy when combined with a bird loss regularizer. With an ARAP elastic energy, the total energy (Eq. 3) for our local deformation is as follows:

$$\underset{V,\{R_{ij}\}}{\text{minimize}} \underbrace{\sum_{i \in V} \frac{1}{2} \|R_i D_i - \tilde{D}_i\|_{W_i}^2}_{ARAP} + \underbrace{\lambda a_i \|V_i - \tilde{V}_i\|_{bird}}_{Localness} \quad (4)$$

where $R_i$ is a d×d rotation matrix, $W_i$ is a $|\mathcal{N}(i)| \times |\mathcal{N}(i)|$ diagonal matrix of cotangent weights, $\tilde{D}_i$ and $D_i$ are 3×|$\mathcal{N}(i)$| matrices of "spokes and rims" edge vectors of the i-th vertex at the rest and deformed states respectively. $\|X\|_{W_i}^2$ denotes $Tr(X^T W_i X)$. Here, $R_i$ is used to denote $X_i$, since the deformation gradient is driven towards a rotation matrix in ARAP energy.

Previous methods have optimized the $\ell_1$ version of Eq. 4 in a less efficient way. The previous methods used a local step that optimizes over per-vertex rotation $R_i$ and a global step that minimizes over vertex positions V using a two-block ADMM scheme. This leads to an expensive optimization with a full ADMM optimization in each global step, making the method too slow for interactive usage. In contrast, applying the three-block ADMM scheme described herein to the local ARAP energy results in a much more efficient solver, which is one ADMM optimization itself. Pseudocode of the three-block ADMM for local ARAP energy in accordance with some aspects is provided below in Algorithm 2.

More concretely, by setting $Z_i = V_i - \tilde{V}_i$, we can further rewrite Eq. 4 as $$\underset{V, \{R_{i_j}\}, Z}{\text{minimize}} \sum_{i \in V} \frac{1}{2} \|R_i D_i - \tilde{D}_i\|_{W_i}^2 + \lambda a_i \|Z_i\|_{bird} \tag{5a}$$

$$\text{s.t. } Z_i = V_i - \tilde{V}_i, \forall i \tag{5b}$$

ALGORITHM 2: Three-block ADMM for local ARAP Energy

Input: A triangle or tetrahedral mesh $\tilde{V}$, T
Output: Deformed vertex positions V
V ← $\tilde{V}$
While not converged do
| $R_i$ ← local_step_X(V, $\tilde{V}$)  ▷ local step 1
| $Z_i$ ← local_step_Z(V, $\tilde{V}$)  ▷ local step 2
| V ← global_step($X_i$, $Z_i$, $\tilde{V}$)  ▷ global step
| $U_i$ ← dual_update ($Z_i$, $V_i$, $\tilde{V}_i$)  ▷ dual update 1
end The above minimization problem can be solved efficiently using the following ADMM update steps:

$$R_i^{k+1} \leftarrow \arg\min_{R_i \in SO(3)} \frac{1}{2} \|R_i D_i - \tilde{D}_i\|_{W_i}^2 \tag{6a}$$

$$Z_i^{k+1} \leftarrow \arg\min_{Z_i} \lambda a_i \|Z_i\|_{bird} + \frac{\rho}{2} \|V_i^{k+1} - \tilde{V}_i - Z_i + U_i^k\|_2^2 \tag{6b}$$

$$V^{k+1} \leftarrow \arg\min_V W(VLV - BV) + \frac{\rho}{2} \|V - \tilde{V} - Z^k + U^k\|_2^2 \tag{6c}$$

$$U_i^{k+1} \leftarrow U_i^k + V_i^{k+1} - \tilde{V}_i - Z_i^{k+1} \tag{6d}$$

where $\rho$ is a fixed penalty parameter.

The various steps in this ADMM-based algorithm are computed as follows.

Updating $R_i$: Local step 1 (Eq. 6a) is an instance of the Orthogonal Procrustes problem, which can be solved in the same way as the rotation fitting step. The optimal $R_i$ is derived from the singular value decomposition of $M_i = \mathcal{U}_i \Sigma_i \mathcal{V}_i^T$ where $M_i = D_i \tilde{D}_i^T$:

$$R_i^{k+1} \leftarrow \mathcal{V}_i \mathcal{U}_i^T \tag{7}$$

Updating $Z_i$: Following the derivation of the proximal operator of bird loss, the local step 2 (Eq. 6b) is solved using a bird loss-specific shrinkage step:

$$Z_i^k \leftarrow S_{\lambda a_i}^k (V_i - \tilde{V}_i + U_i) \tag{8}$$

$$S_{\lambda a_i}(x) = \begin{cases} \left(\frac{\rho s - \lambda a_i s / \|x\|_2}{\rho s - \lambda a_i}\right) + x, & \text{if } \|x\|_2 \leq s \\ x, & \text{otherwise} \end{cases} \tag{9}$$

To avoid local minima in the shrinkage step, this assumes $\rho$ is set to satisfy $$\rho > \frac{\max(\lambda a_i)}{s}$$

(see Sec. 1 of the supplementary material).

Updating V: The global step (Eq. 6c) can be achieved by solving a linear system:

$$(L + \rho I)V = B + \rho(\tilde{V} + Z^k - U^k) \tag{10}$$

where the Laplacian L and B. For fixed $\rho$, an efficient implementation is obtained by precomputing and storing the Cholesky factorization of L+$\rho$I.

Local Neo-Hookean Energy: The local deformation scheme described herein can be further extended to physics-based elasticity energies, e.g., Neo-Hookean energy. Using the Neo-Hookean energy as the elasticity energy, the optimization problem in Eq. 3 can be written as follows:

$$\underset{V, \{X_j\}, \{Z_i\}}{\text{minimize}} \sum_{j \in T} \underbrace{E_{nh}(X_j)}_{Neo-Hookean} + \sum_{i \in V} \underbrace{\lambda a_i \|V_i - \tilde{V}_i\|_{bird}}_{Locality} \tag{11a}$$

$$\text{s.t. } X_j = sym(D_j V), \forall j, \tag{5}$$

where T denotes all the elements.

Similarly, by introducing $Z_i = V_i - \tilde{V}_i$, the local Neo-Hookean energy can be minimized using ADMM.

The ADMM update (Alg. 1) for the above minimization problem is as follows:

$$X_j^{k+1} \leftarrow \arg\min_{X_j} E_{nh}(X_j) + \frac{\gamma}{2} \|sym(D_j V) - X_j + W_j\|_2^2 \tag{12a}$$

$$Z_i^{k+1} \leftarrow \arg\min_{Z_i} \lambda a_i \|Z_i\|_{bird} + \frac{\rho}{2} \|V_i^{k+1} - \tilde{V}_i - Z_i + U_i^k\|_2^2 \tag{12b}$$

$$V^{k+1} \leftarrow \arg\min_V \sum_{j \in T} \frac{\gamma}{2} \|sym(D_j V) - X_j + W_j\|_2^2 + \tag{12c}$$

$$\sum_{i \in V} \frac{\rho}{2} \|V - \tilde{V} - Z^k + U^k\|_2^2$$

$$W_j^{k+1} \leftarrow W_j^k + sym(D_j V) - X_j \tag{12d}$$

$$U_i^{k+1} \leftarrow U_i^k + V^{k+1} - \tilde{V}_i - Z_i^{k+1} \tag{12e}$$

Here, $\rho$ and $\gamma$ are fixed penalty parameters.

The local step 2 (updating $Z_i$) and the global step (updating V) can be solved in the same way as the local ARAP energy (as discussed hereinabove).

Updating $X_j$: Local step 1 (Eq. 12a) can be solved by performing the energy minimization on the singular values of $sym(D_j V) + W_j$. This is a proximal operator of $E_{nh}$ at rotation-invariant $sym(D_j V) + W_j$.

The proximal operator of $E_{nh}$ and the singular value decomposition of $sym(D_j V) + W_j$ can be denoted as:

$$prox_{E_{nh}}(X_j) = E_{nh}(X_j) + \frac{\gamma}{2} \|sym(D_j V) + W_j - X_j\|_2^2 \tag{13}$$

$$sym(D_j V) + W_j = \mathcal{U}_j \sum_j \mathcal{V}_j^T \tag{14}$$

where $\gamma$ is the augmented Lagrangian parameter for $X_j$.

The optimal $X_1$ can be computed as:

$$\sum_{j}^{k+1} \leftarrow \underset{\Sigma_j}{\text{ARG MIN}} \; PROX_{E_{nh}}\left(\mathbf{u}_j \sum_j v_j^r\right) \quad (15)$$

$$X_j \leftarrow \mathbf{u}_j \sum_{j}^{k+1} v_j^r \quad (16)$$

Specifically, the SVD of sym($D_jV$)+$W_j$ can be computer and the minimization of prox$_{E_{nh}}$ can be performed only on its singular values, while keeping singular vectors unchanged. The above optimization of the singular values $E_j^{k+1}$ can be performed using an L-BFGS solver.

Extension to Other Elastic Energies: The technology described herein can easily generalize across different dimensions and material models. Switching the material model involves a change on the minimization problem in the local step 1

$$\underset{X}{\arg\min},$$

which can be optimized over the singular values of the symmetric factor $X_i$ of the deformation gradient.

Figure 3:
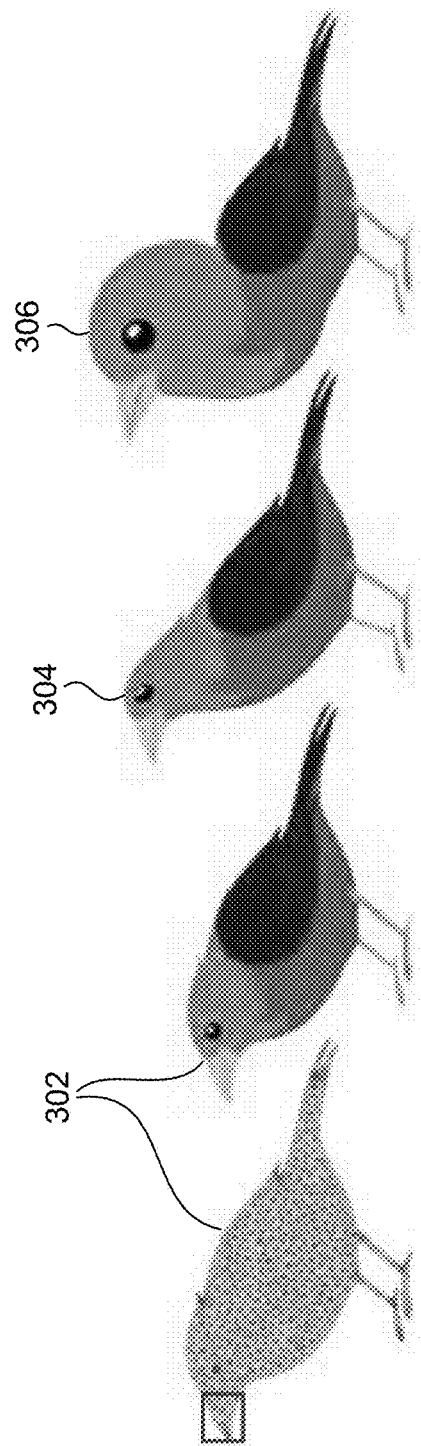
FIG. 3 provides examples of deformed shapes generated using different types of elastic energies in accordance with some implementations of the present disclosure.

As-Conformal-As-Possible (ACAP) Energy. For editing tasks where users intend to locally scale the geometry while preserving the texture, a goal may be to constrain the angle preservation, or conformality. To illustrate, FIG. 3 shows an undeformed shape 302, a deformed 304 shape using ARAP, and a deformed shape 306 using ACAP. As shown in FIG. 3, as-conformal-as-possible (ACAP) energy encourages conformality, thus better preserving the color texture by allowing local scaling, while the as-rigid-as-possible (ARAP) energy favors preserving the rigidity. Here, the handle (in blue) is placed around the eye and an affine constraint is added to the red region.

The ARAP energy can be adapted to ACAP energy by allowing local scaling:

$$E_{ACAP}(V) = \sum_{k \in T} \sum_{i,j \in \mathcal{N}(k)} \frac{w_{ij}}{2} \|s_k R_i \tilde{d}_{ij} - d_{ij}\|_2^2 \quad (17)$$

where $s_k$ is a scalar controlling the scaling of the local patch and can be computed analytically.

Cloth. The technology described herein also generalizes to higher co-dimensional settings, such as deformable thin sheets and cloth in $\mathbb{R}^3$. For instance, the cloth deformation can be modeled using ARAP elasticity (Eq. 4), hard strain limiting, and quadratic bending resistance.

1D Polyline. The technology described herein can also be extended to the local editing of 1D polyline in vector graphics. For instance, the deformation of a polyline can be modeled using the ARAP energy (Eq. 4) with uniform weights.

With reference again to FIG. 1, the image processing system also includes an interactive editing engine 112 that allows a user to interact with the image processing system 104 to generate deformed shapes with local deformations. The interactive editing engine 112 provides one or more user interfaces for interacting with the image processing system 104. The user interfaces allow a user to provide a shape to be deformed. The user interfaces also allow the user to provide input to deform the shape. In some instances, the input to deform a shape comprises a user moving a control handle to move one or more vertices of the shape. The input can further comprise position constraints and/or affine constraints on one or more vertices. In some configurations, the user can also provide input specifying the threshold s to control the extent of vertex position change required before the bird loss has no penalty, and/or input specifying the slope factor w to control the extent to which the bird loss pulls a vertex back to its rest position.

The interactive editing engine 112 facilitates interactive editing of a shape allowing a user to iteratively provide inputs to generate various deformations. For instance, a user could provide an initial shape and an initial input to deform the shape to generate a first deformed shape. The user could then provide input to deform the first deformed shape to generate a second deformed shape. In that instance, the vertex positions in the first deformed shape act as rest positions when determined the deformed vertex positions for the second deformed shape. The process can continue with the user providing inputs until a final deformed shape is generated.

Local shape deformation in accordance with the technology described herein was evaluated by comparing it against existing local deformation tools and showcasing its extension to various elastic energies. FIGS. 4-12 illustrate results of these evaluations. The colormaps in the figures visualize the vertex displacement with respect to the rest shape. These results were generated by implementing a 2D version of the local shape deformation approach described herein in MATLAB with gptoolbox, and a 3D version in C++ with libigl based on the WRAPD framework. A 2D version of the local shape deformation approach described herein was also implemented in C++ for runtime evaluation and comparison. Benchmarks were performed using a MacBook Pro with an Apple M2 processor and 24 GB of RAM for 3D and a Windows desktop with an i9-9900K 3.60 GHz CPU for 2D.

Figure 4:
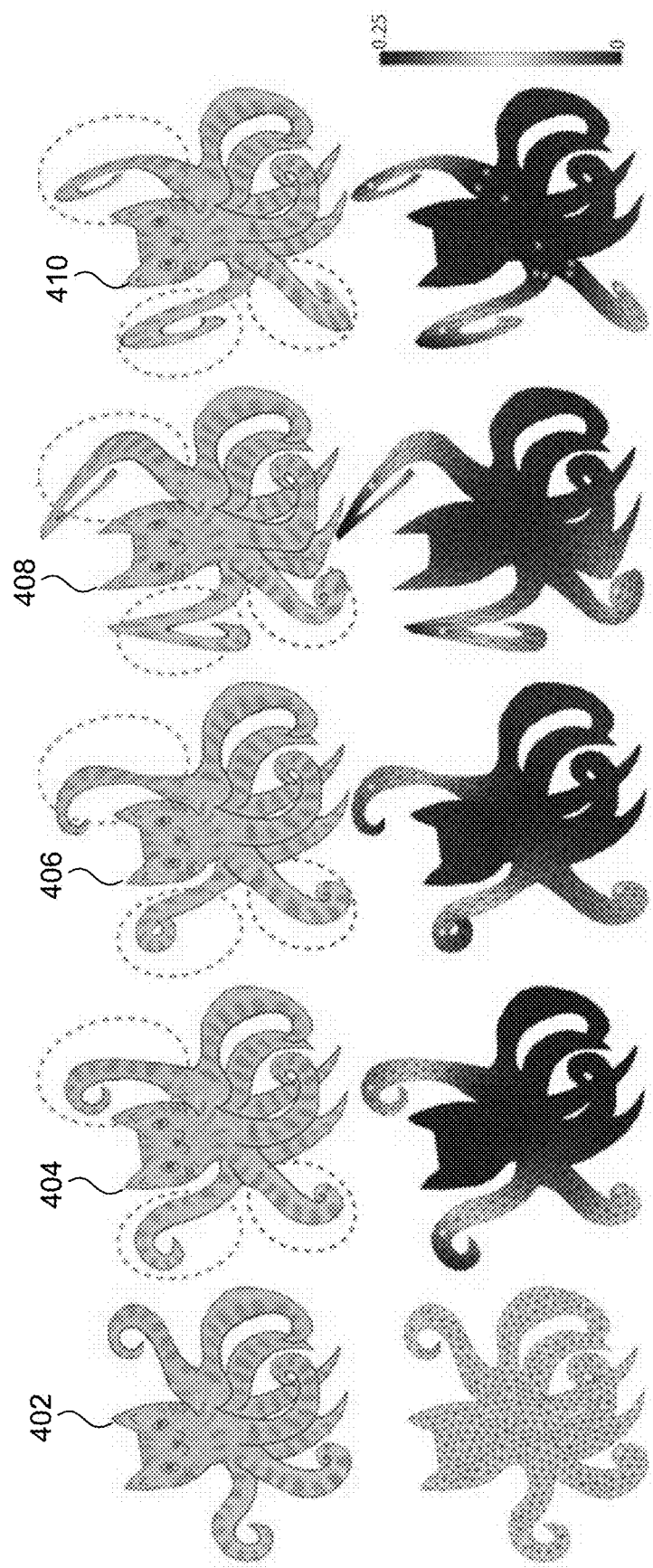
FIG. 4 provides a set of examples comparing a deformed shape generated in accordance with some implementations of the present disclosure and deformed shapes generated using previous shape deformation approaches.
Figure 5:
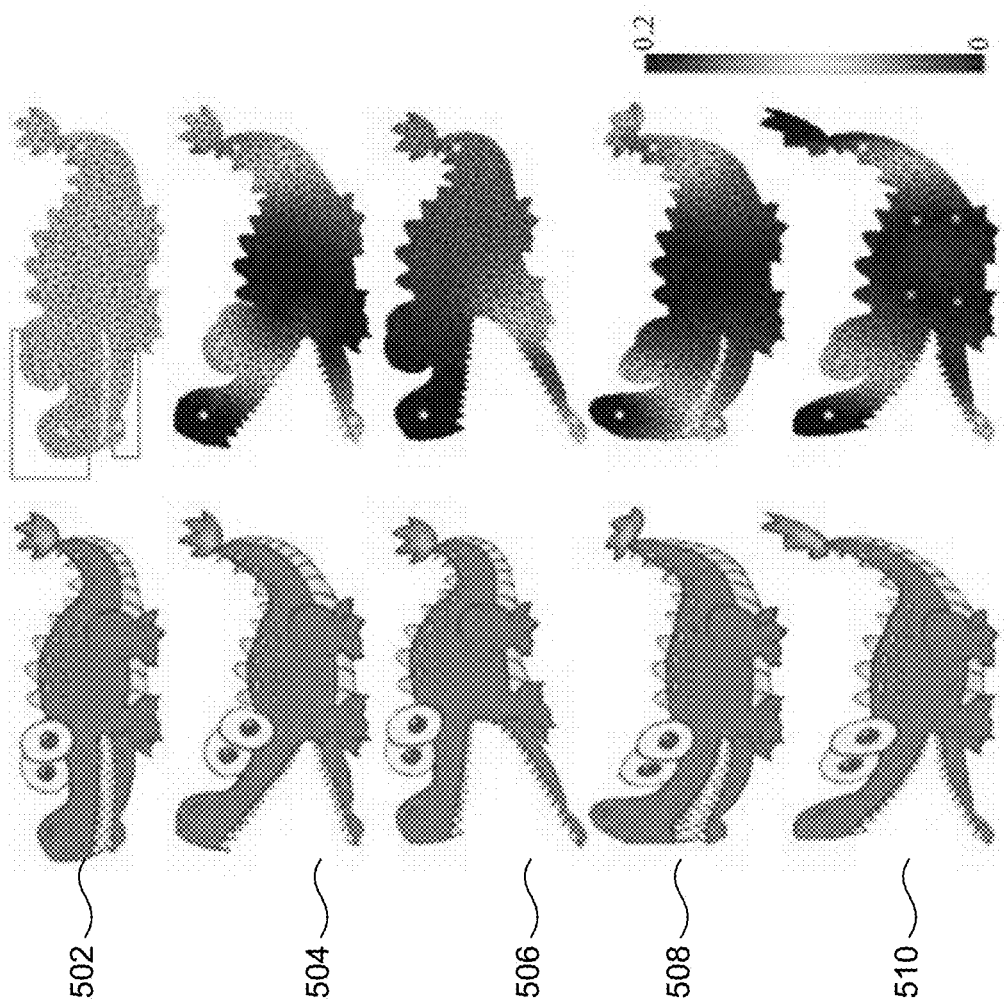
FIG. 5 provides another set of examples comparing a deformed shape generated in accordance with some implementations of the present disclosure and deformed shapes generated using previous shape deformation approaches.

The local shape deformation of the technology described herein was compared against other local editing tools, including: i) $\ell_1$-based deformation; ii) regularized Kelvinlets; and iii) biharmonic coordinates. In particular, FIG. 4 provides examples showing a comparison of: an undeformed shape 402; a deformed shape 404 using the bird loss regularization described herein; a deformed shape 406 using $\ell_1$-based deformation; a deformed shape 408 using regularized Kelvinlets; and a deformed shape 410 using biharmonic coordinates. In particular, FIG. 5 provides another set of examples showing a comparison of: an undeformed shape 502; a deformed shape 504 using the bird loss regularization described herein; a deformed shape 506 using $\ell_1$-based deformation; a deformed shape 508 using regularized Kelvinlets; and a deformed shape 510 using biharmonic coordinates. Among them, the use of $\ell_1$-based regularization causes artifacts (see deformed shapes 406 and 506). Regularized Kelvinlets technique deforms a shape based on Euclidean distances, thus not shape-aware, creating artifacts when two disjoint parts are close in Euclidean space but far away geodesically (see the blue region in deformed shape 408 and the teeth area in deformed shape 508). Methods based on biharmonic coordinate (deformed shapes 410 and 510) usually require careful placement of additional fixed control points to pre-determine the ROI. The latter two methods also do not minimize any elastic energy in the deformation process, and thus their deformations are more susceptible to shape distortion (see 508 and 510).

Figure 6:
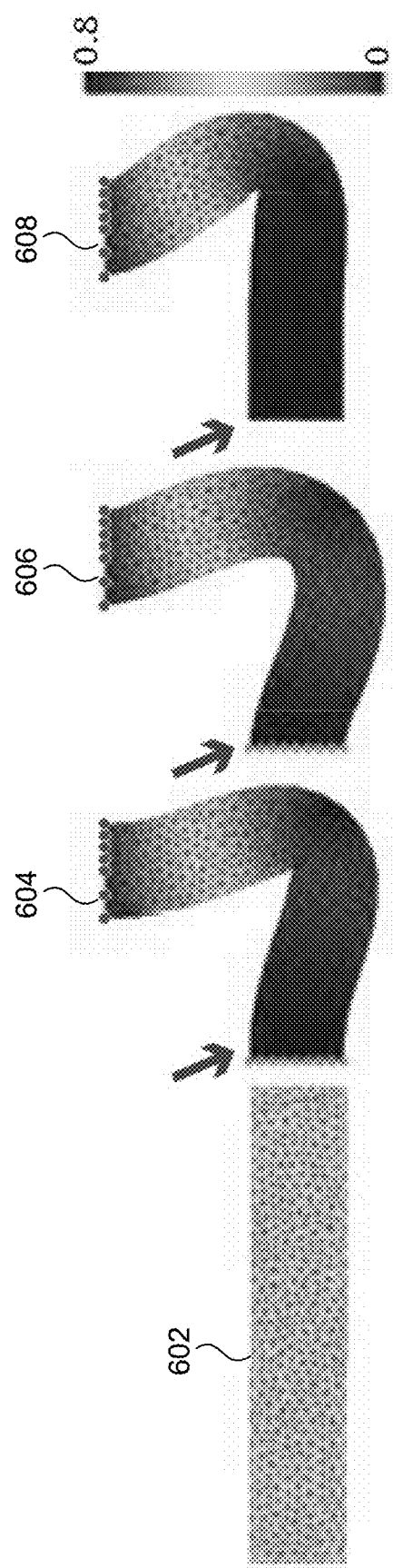
FIG. 6 provides a further set of examples comparing a deformed shape generated in accordance with some implementations of the present disclosure and deformed shapes generated using previous shape deformation approaches.

FIG. 6 provides examples showing a comparison of: an undeformed shape 602; deformed shapes 604 and 606 using a sparse deformation method that directly introduces a sparsity-induced norm in ARAP energy; and a deformed shape 608 using the bird loss regularization described herein. As shown in FIG. 6, the resulting deformation for the deformed shapes 604 and 606 is sparse but not local, thus requiring the setup of additional fixed constraints. In contrast, employing the bird loss regularization in accordance with the technology described herein produces a deformed shape 608 in which the deformation is local, natural, and shape-aware; it automatically adapts the ROI without the need for careful control primitive setup.

Figure 7:
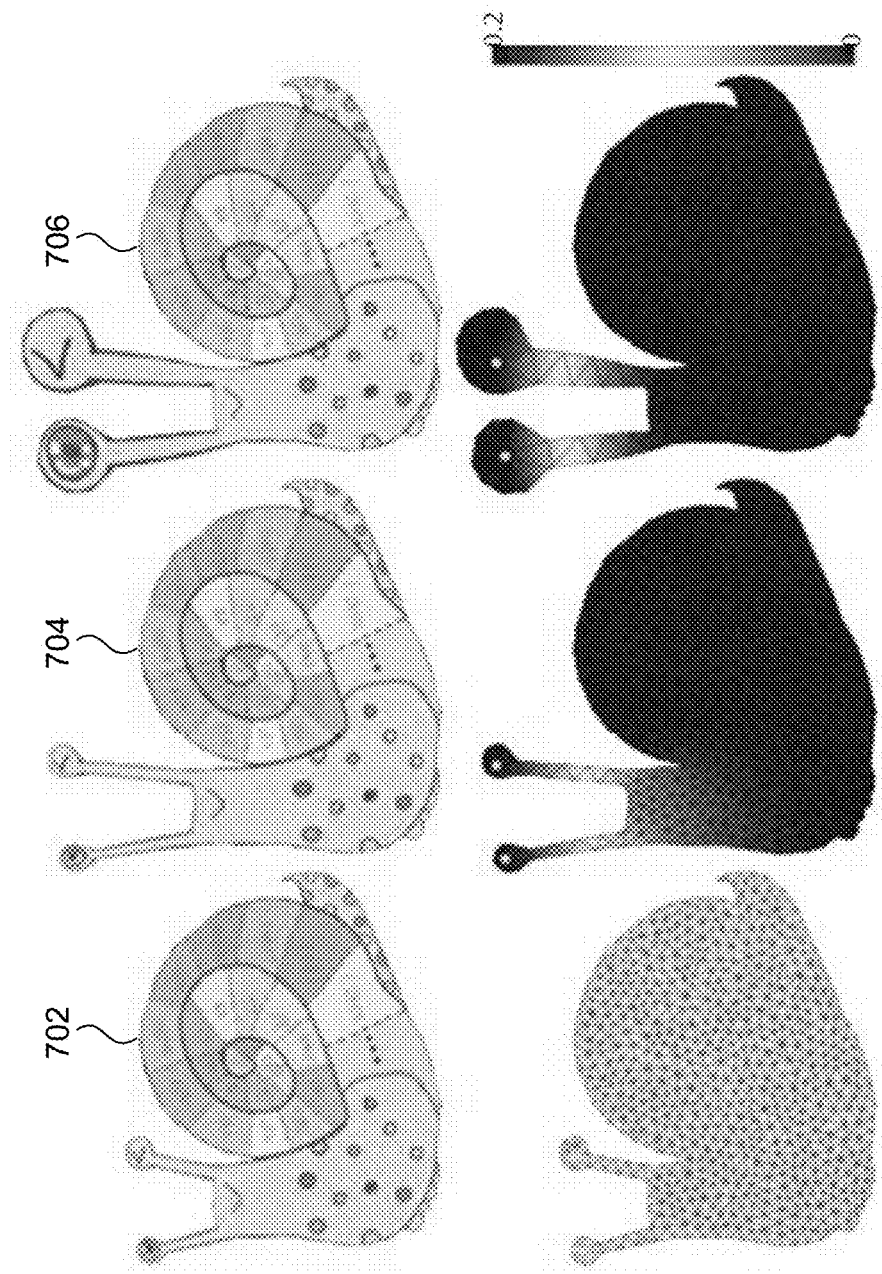
FIG. 7 provides examples of deformed shapes generated using different types of elastic energies in accordance with some implementations of the present disclosure.

The local shape deformation of the technology described herein provides ROI adaptions in different situations. First, the ROI adapts to different energy models—for example, the local ACAP has a smaller ROI than the local ARAP energy as the latter allows for local scaling. This is illustrated in FIG. 7, which provides an undeformed shape 702, a deformed shape 704 using ARAP energy with bird loss regularization, and a deformed shape 706 using ACAP energy with bird loss regularization. As shown in FIG. 7, the technology described herein automatically choose a natural ROI based on the elastic energy in use. Here, the same parameter settings for both the local ARAP and local ACAP energies were used. With the local ACAP energy, a smaller ROI is provided than the case of local ARAP energy as the ACAP energy allows for local scaling.

Figure 8:
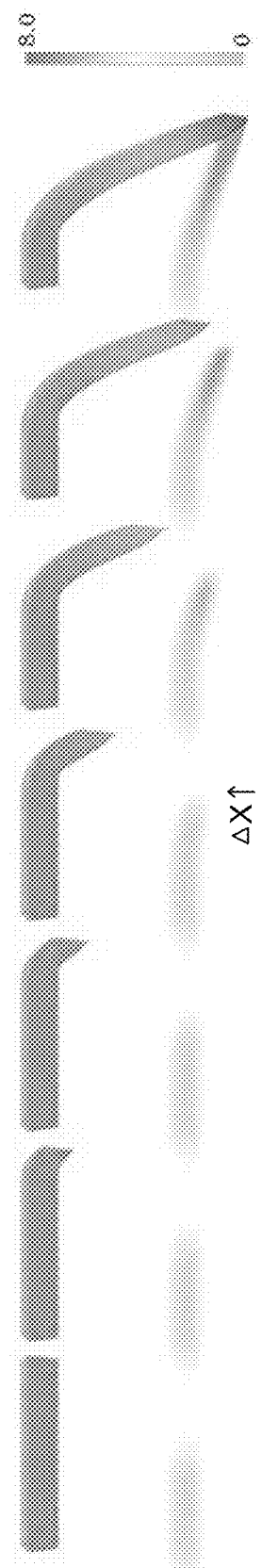
FIG. 8 provides examples shows deformation of a bar in which the region of influence gradually increases as the deformation of the bar becomes larger in accordance with some implementations of the present disclosure.

Second, the ROI adapts to different extents of deformation As an example to illustrate, FIG. 8 shows deformation of a bar in which the ROI gradually increases as the deformation of the bar becomes larger. The technology described herein naturally enables an adaptive region of influence under the different deformations. In FIG. 8, only the vertices (yellow) on the rightmost end are selected as handles. From left to right, the offset of the rightmost end is 0.0, 0.5, 1.0, 2.0, 4.0, 6.0 and 8.0 respectively.

Figure 9:
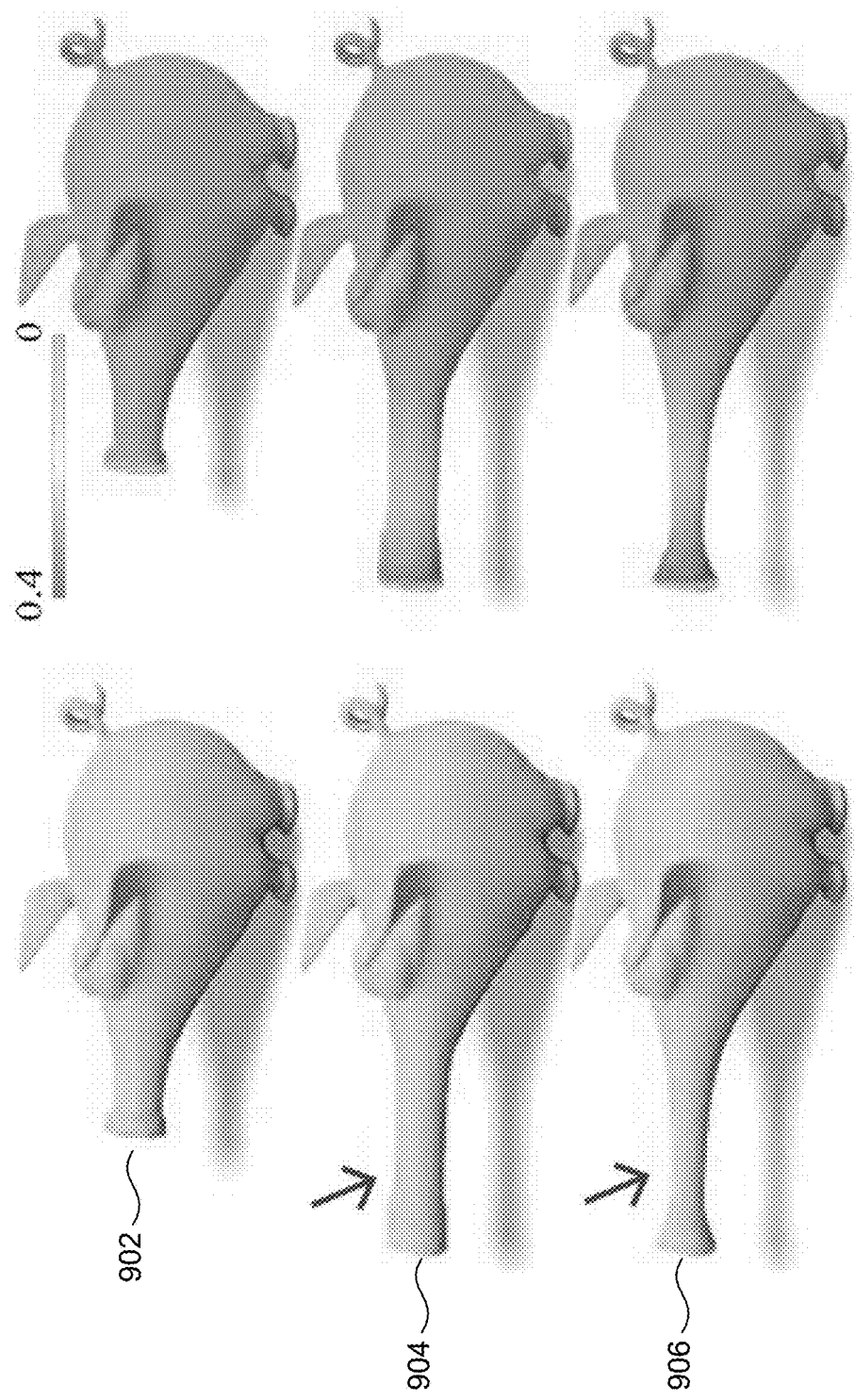
FIG. 9 provides examples of deformed shapes generated using different types of elastic energies in accordance with some implementations of the present disclosure.

The local deformation style can be configured by choosing various elastic energy models. For example, the local Neo-Hookean energy leads to deformation that preserves volume, while the local ARAP energy is volume agnostic. This is illustrated in FIG. 9, which includes an undeformed shape 902, a deformed shape 904 using ARAP with a bird loss regularization, and a deformed shape 906 using Neo-Hookean energy with a bird loss regularization. As shown in FIG. 9, only the vertices (yellow) on the nose of the pig are selected as handles. Note that the deformed shape 906 using Neo-Hookean energy exhibits the volume-preservation property.

Figure 10:
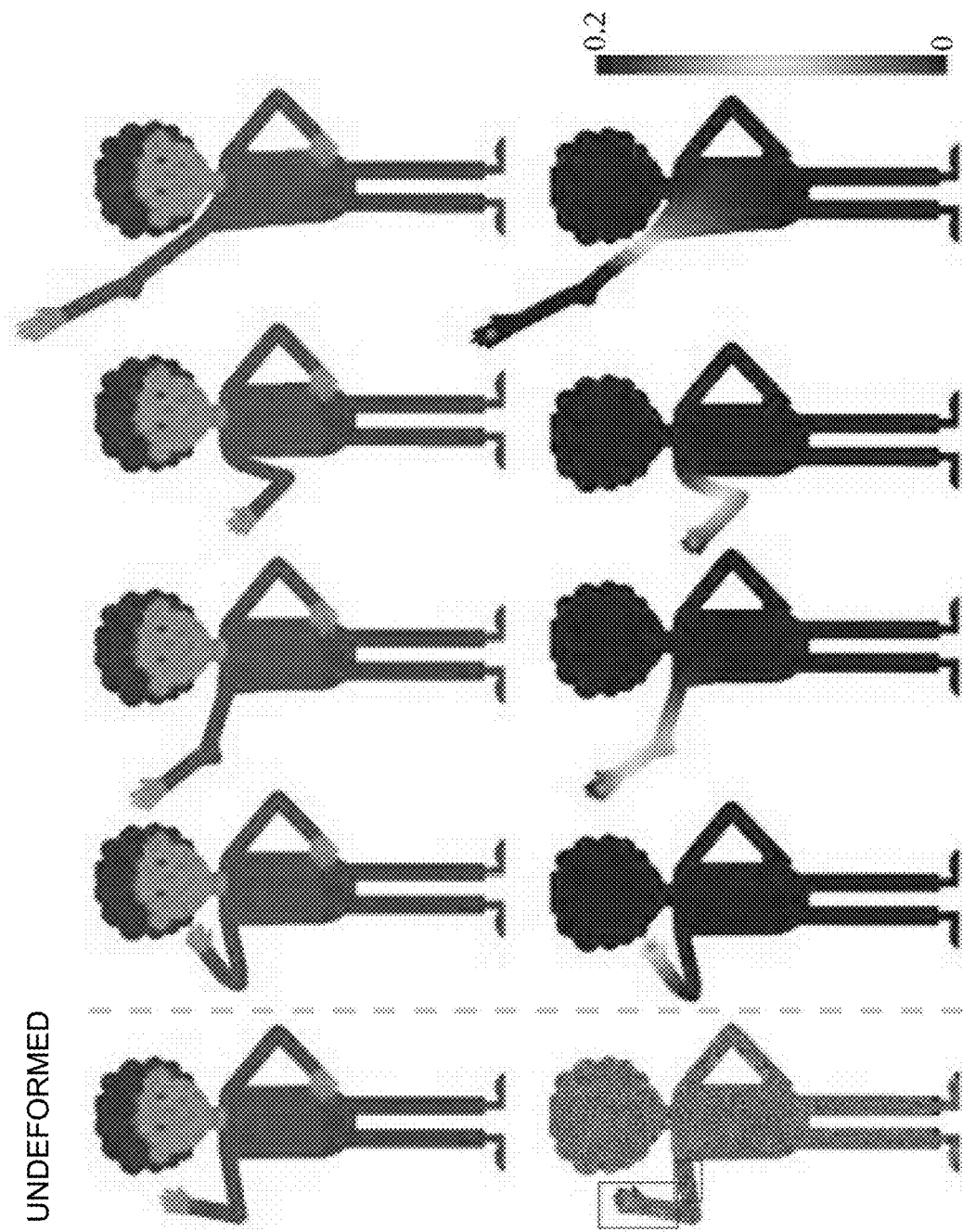
FIG. 10 provides examples illustrating use of an affine constraint in accordance with some implementations of the present disclosure.

The deformation can be further tuned by introducing additional affine constraints—for instance, to enable the character to wave hands in FIG. 10 (character used under CC license: Black Man Waving Hand Cartoon Vector.svg from Wikimedia Commons by Videoplasty.com, CC-BY-SA 4.0), or the crocodile to open its mouth in FIG. 5—in a natural way.

In terms of performance, the technology described herein is able to efficiently minimize the energy at interactive rate, while a previous group lasso $\ell_1$-based method is too slow to run in real-time. Because the previous group lasso $\ell_1$-based method only supports 2D ARAP energy, Table 1 provides a comparison of the runtime of using the three block ADMM approach described herein (using both the bird loss ("ARAP w/Bird Loss") and $\ell_1$ loss ("ARAP")) and the previous group lasso $\ell_1$-based method ("$\ell_1$-Based Method") on a 2D ARAP local energy and across different mesh resolutions and deformations. Measured with the same convergence threshold, the approach of the technology described herein runs orders of magnitude faster than the previous group lasso $\ell_1$-based method, achieving roughly 1000× speedup for small deformation and 100× speedup for large deformation.

TABLE 1

| | Runtime Comparison | | |
|---|---|---|---|
| # Triangles | ARAP w/Bird Loss | ARAP | $\ell_1$-Based Method |
| | Small Deformation | | |
| 200 | 0.00087 s | 0.00015 s | 0.11 s |
| 1000 | 0.0055 s | 0.0010 s | 0.59 s |
| 100000 | 0.058 s | 0.017 s | 2.05 s |
| | Large Deformation | | |
| 200 | 0.0053 s | 0.00032 s | 0.022 s |
| 1000 | 0.0078 s | 0.0018 s | 0.17 s |
| 100000 | 0.095 s | 0.027 s | 2.03 s |

Figure 11:
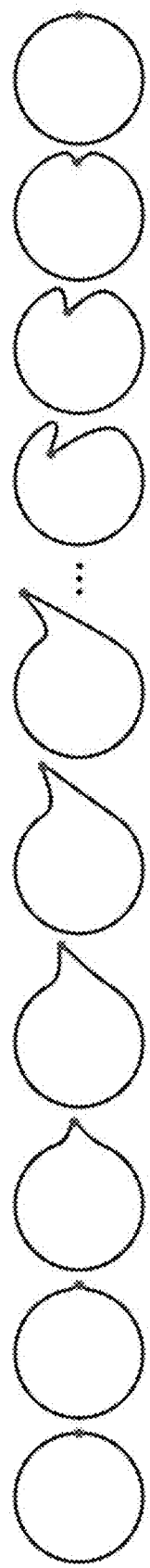
FIG. 11 provides examples illustrating shape deformation of a 1D polyline in accordance with some implementations of the present disclosure.
Figure 12:
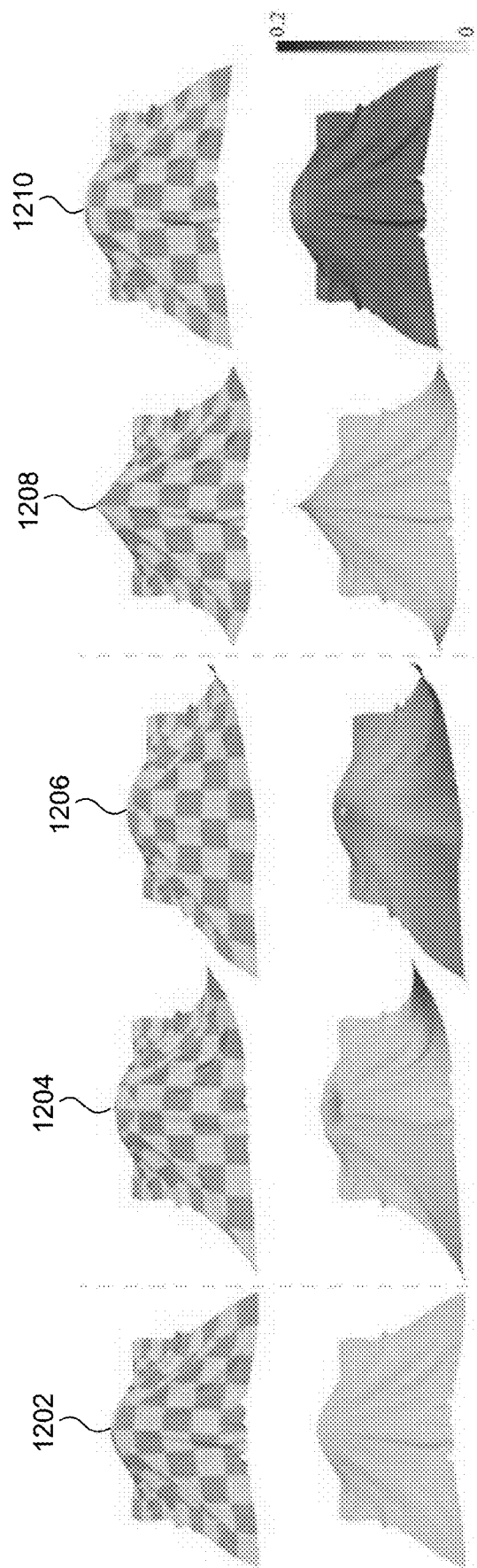
FIG. 12 provides examples illustrating shape deformation of a cloth in accordance with some implementations of the present disclosure.

The local shape deformation described herein can easily generalize to other dimensions and material models, such as the ACAP deformation, cloth deformation, and 1D polyline deformation. As shown in FIGS. 3 and 7, the local ACAP energy enables local scaling and better preserves the texture around the deformed region. As shown in FIG. 11, a user can interactively edit a polyline and naturally recover its rest shape, which is a desirable feature by the users. For cloth deformation, to deform a cloth in a physically plausible way, the deformation locality is particularly useful, as otherwise a local edit of the cloth may cause a global change leading to unexpected intersections with other objects. FIG. 11 illustrates cloth deformation by showing: an undeformed shape 1202, deformed shapes 1204 and 1208 using the technology described herein, and deformed shapes 1206 and 1210 using a previous approach. The approach of the technology described herein enables a user to locally edit a simulated cloth in an interactive fashion as shown for deformed shapes 1204 and 1208, without the need of rerunning the simulation. In contrast, quasi-static deformations generated by directly moving control points have global effects for the deformed shapes 1206 and 1210, easily deviating the edit from the initial shape in a distinct way. In the bottom row of FIG. 12, to show the extent to which the handles affect cloth vertex positions, a colormap illustrates the vertex displacement from the input cloth. The handles moved by the user are in yellow.

Example Methods for Local Shape Deformation

Figure 13:
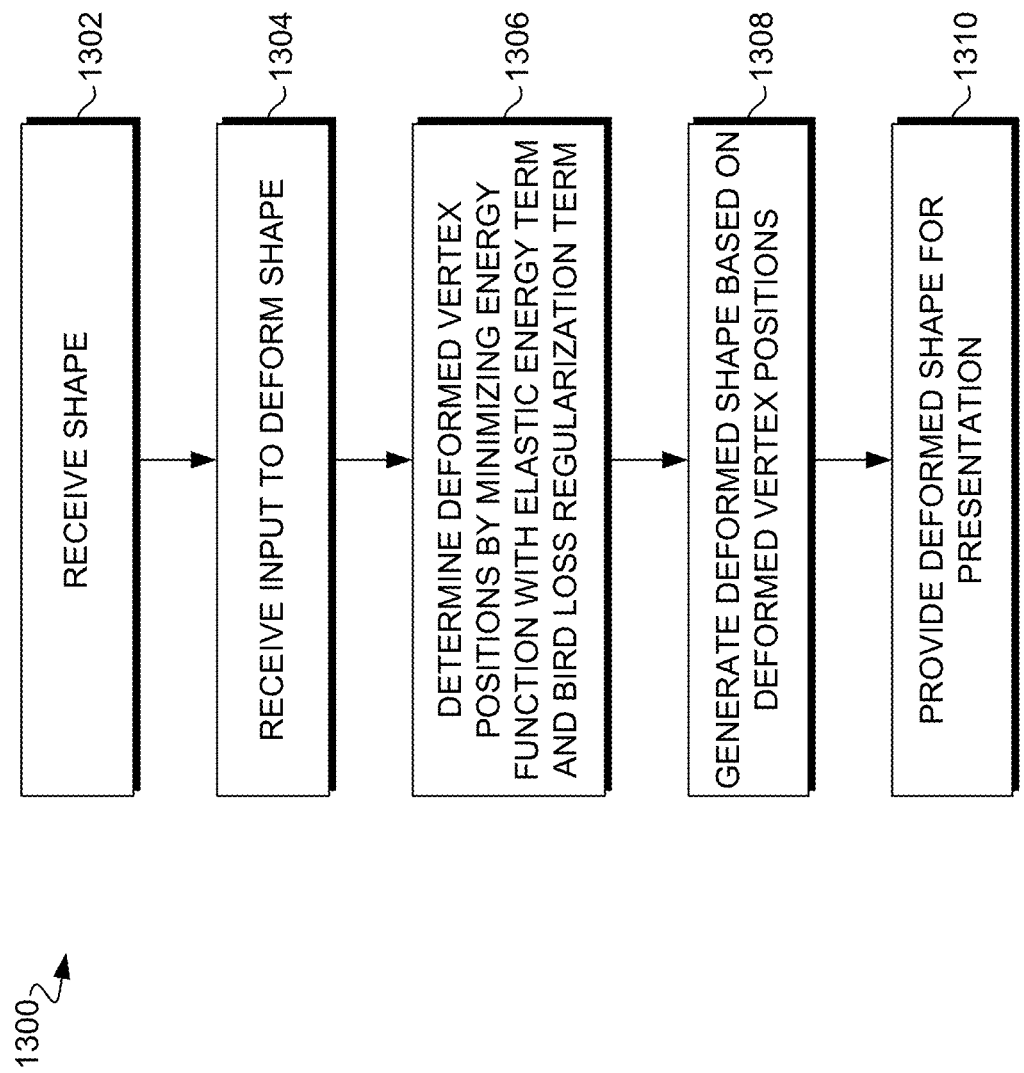
FIG. 13 is a flow diagram showing a method for generating a deformed shape using a bird loss regularization in accordance with some implementations of the present disclosure.

With reference now to FIG. 13, a flow diagram is provided that illustrates a method 1300 for local shape deformation. The method 1300 can be performed, for instance, by the image processing system 104 of FIG. 1. Each block of the method 1300 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 1302, a shape is received. The shape comprises a number of vertices with each vertex having a vertex position (i.e., a rest position). The shape can be, for instance, a triangle mesh, a tetrahedral mesh, or a 1D polyline. Input to deform the shape is received at block 1304. The input can comprise, for instance, user input moving one or more vertices of the shape to a new vertex position (e.g., using a handle). The input could further comprise a position constrain and/or affine constraint on one or more vertices. In some cases, the user can provide input setting the threshold and/or slope factor used by the bird loss function.

Given the shape and input to deform the shape, deformed vertex positions are determined, as shown at block 1306. The deformed vertex positions are determined by minimizing an energy function that includes an elastic energy term and a bird loss regularization term. The bird loss regularization term is a function of vertex position change between the rest vertex position and the deformed vertex position for any vertex having a vertex position change below a threshold. For any vertex having a vertex position change above the threshold, the bird loss regularization is a constant.

A deformed shape is generated based on the deformed vertex positions, as shown at block 1308, and the deformed shape is provided for presentation, as shown at block 1310. Although not shown in FIG. 13, the process of receiving deformation input (block 1304), determining deformed vertex positions (block 1306), generating a deformed shape (block 1308), and providing the deformed shape for presentation (block 1310) can be repeated any number of times.

Figure 14:
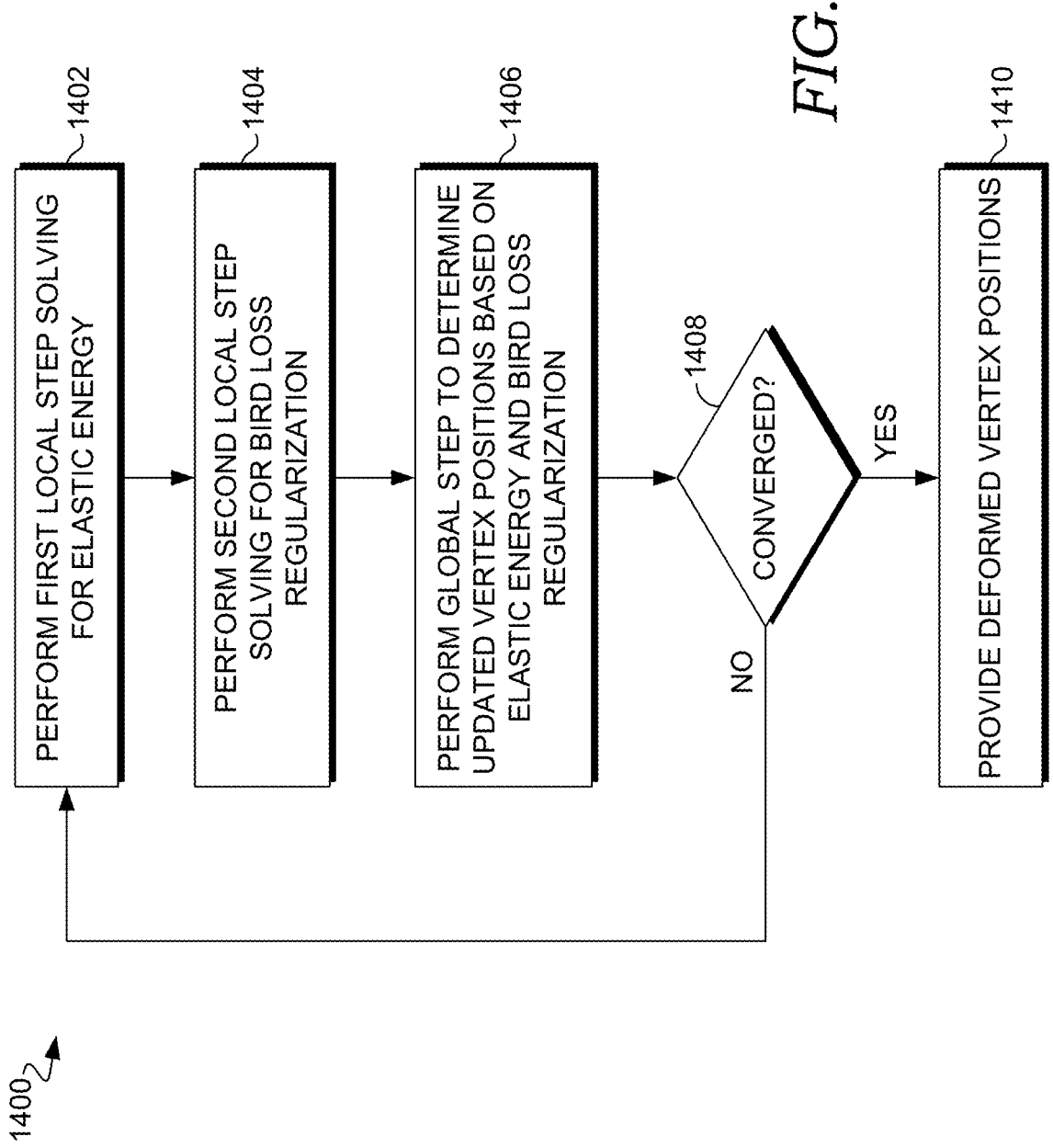
FIG. 14 is a flow diagram showing a method for minimizing an energy function for shape deformation using a three block alternating direction method of multipliers in accordance with some implementations of the present disclosure.

Turning next to FIG. 14, a flow diagram is provided illustrating a method 1400 for minimizing an energy function for shape deformation using a three block alternating direction method of multipliers. The method 1400 can be performed for instance, by the image processing system 104 of FIG. 1. As shown in FIG. 1402, a first local step is performed to solve for the elastic energy term of the energy function. This first local step can comprise finding the optimal symmetric factor $X_i$ of the deformation gradient, which can be formulated as a minimization problem on the its singular values. As shown at block 1404, a second local step is performed to solve for the bird loss regularization term of the energy function. This second local step can comprise minimizing the bird loss regularization term for each $Z_{ij}$, which can be solved using a shrinkage step. As shown at block 1406, a global step is performed that updates the vertex positions of the shape based on the elastic energy term from the first local step and the regularization term from the second local step. This global step can comprise updating vertex positions V, which can be achieved by solving a linear system. The process of blocks 1402, 1404, and 1406 are repeated until convergence is determined at block 1408. At that point, the deformed vertex positions are provided (e.g., to generate a deformed shape), as shown at block 1410.

Exemplary Operating Environment

Figure 15:
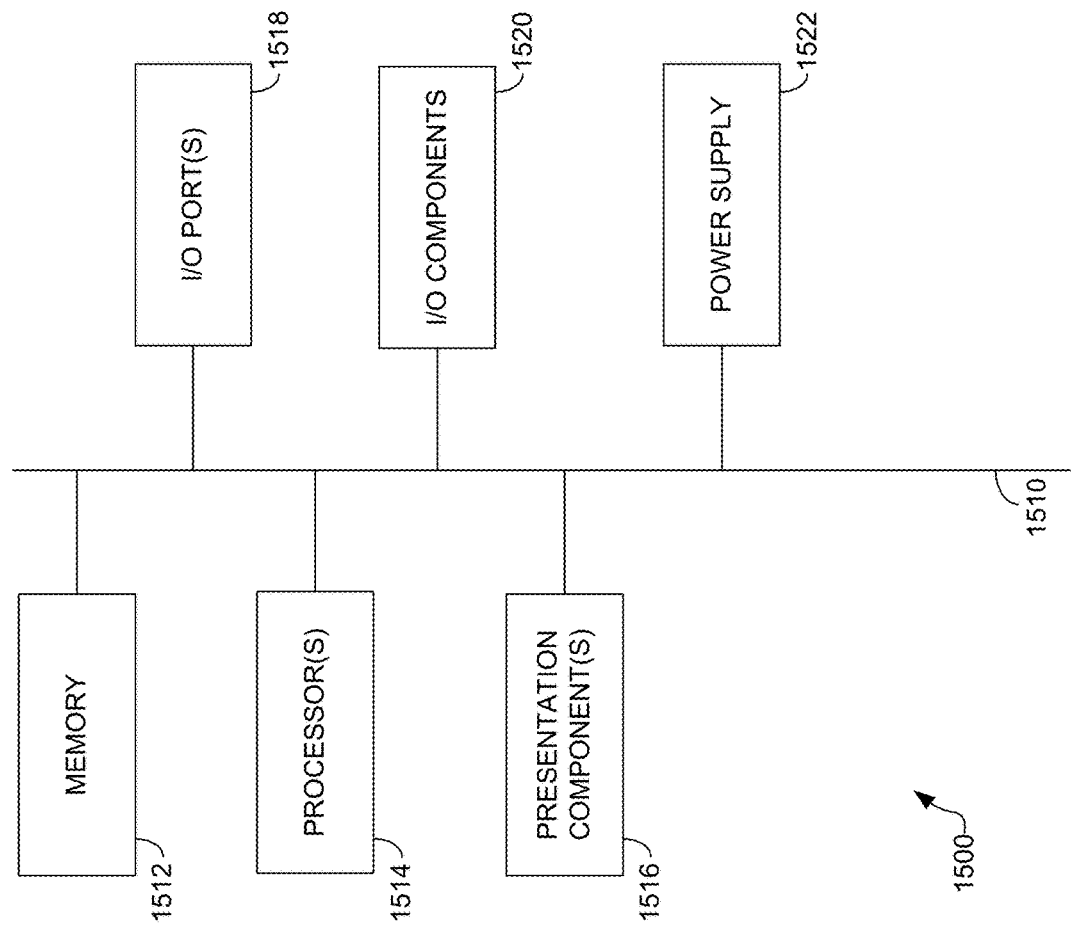
FIG. 15 is a block diagram of an exemplary computing environment suitable for use in implementations of the present disclosure.

Having described implementations of the present disclosure, an exemplary operating environment in which embodiments of the present technology can be implemented is described below in order to provide a general context for various aspects of the present disclosure. Referring initially to FIG. 15 in particular, an exemplary operating environment for implementing embodiments of the present technology is shown and designated generally as computing device 1500. Computing device 1500 is but one example of a suitable computing environment and is not intended to suggest any limitation as to the scope of use or functionality of the technology. Neither should the computing device 1500 be interpreted as having any dependency or requirement relating to any one or combination of components illustrated.

The technology can be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology can be practiced in a variety of system configurations, including hand-held devices, consumer electronics, general-purpose computers, more specialty computing devices, etc. The technology can also be practiced in distributed computing environments where tasks are performed by remote-processing devices that are linked through a communications network.

With reference to FIG. 15, computing device 1500 includes bus 1510 that directly or indirectly couples the following devices: memory 1512, one or more processors 1514, one or more presentation components 1516, input/output (I/O) ports 1518, input/output components 1520, and illustrative power supply 1522. Bus 1510 represents what can be one or more busses (such as an address bus, data bus, or combination thereof). Although the various blocks of FIG. 15 are shown with lines for the sake of clarity, in reality, delineating various components is not so clear, and metaphorically, the lines would more accurately be grey and fuzzy. For example, one can consider a presentation component such as a display device to be an I/O component. Also, processors have memory. The inventors recognize that such is the nature of the art, and reiterate that the diagram of FIG. 15 is merely illustrative of an exemplary computing device that can be used in connection with one or more embodiments of the present technology. Distinction is not made between such categories as "workstation," "server," "laptop," "hand-held device," etc., as all are contemplated within the scope of FIG. 15 and reference to "computing device."

Computing device 1500 typically includes a variety of computer-readable media. Computer-readable media can be any available media that can be accessed by computing device 1500 and includes both volatile and nonvolatile media, removable and non-removable media. By way of example, and not limitation, computer-readable media can comprise computer storage media and communication media.

Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1500. Computer storage media does not comprise signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1512 includes computer storage media in the form of volatile and/or nonvolatile memory. The memory can be removable, non-removable, or a combination thereof. Exemplary hardware devices include solid-state memory, hard drives, optical-disc drives, etc. Computing device 1500 includes one or more processors that read data from various entities such as memory 1512 or I/O components 1520. Presentation component(s) 1516 present data indications to a user or other device. Exemplary presentation components include a display device, speaker, printing component, vibrating component, etc.

I/O ports 1518 allow computing device 1500 to be logically coupled to other devices including I/O components 1520, some of which can be built in. Illustrative components include a microphone, joystick, game pad, satellite dish, scanner, printer, wireless device, etc. The I/O components 1520 can provide a natural user interface (NUI) that processes air gestures, voice, or other physiological inputs generated by a user. In some instance, inputs can be transmitted to an appropriate network element for further processing. A NUI can implement any combination of speech recognition, touch and stylus recognition, facial recognition, biometric recognition, gesture recognition both on screen and adjacent to the screen, air gestures, head and eye-tracking, and touch recognition associated with displays on the computing device 1500. The computing device 1500 can be equipped with depth cameras, such as, stereoscopic camera systems, infrared camera systems, RGB camera systems, and combinations of these for gesture detection and recognition. Additionally, the computing device 1500 can be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements can be employed to achieve the desired functionality within the scope of the present disclosure. For example, the components in the embodiments depicted in the figures are shown with lines for the sake of conceptual clarity. Other arrangements of these and other components can also be implemented. For example, although some components are depicted as single components, many of the elements described herein can be implemented as discrete or distributed components or in conjunction with other components, and in any suitable combination and location. Some elements can be omitted altogether. Moreover, various functions described herein as being performed by one or more entities can be carried out by hardware, firmware, and/or software, as described below. For instance, various functions can be carried out by a processor executing instructions stored in memory. As such, other arrangements and elements (e.g., machines, interfaces, functions, orders, and groupings of functions) can be used in addition to or instead of those shown.

Embodiments described herein can be combined with one or more of the specifically described alternatives. In particular, an embodiment that is claimed can contain a reference, in the alternative, to more than one other embodiment. The embodiment that is claimed can specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present technology can generally refer to the technical solution environment and the schematics described herein, it is understood that the techniques described can be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

What is claimed is:

1. A computer-implemented method comprising:
receiving a shape comprising a plurality of vertices, each vertex having a vertex position;
receiving input moving at least one vertex from the plurality of vertices to a new vertex position;
based on the new vertex position for the at least one vertex, determining deformed vertex positions for the plurality of vertices by minimizing an energy function that includes an elastic energy term and a regularization term, wherein the regularization term is a function of vertex position change for each vertex having a vertex position change below a threshold and a constant for each vertex having a vertex position change above the threshold; and generating a deformed shape based on the deformed vertex positions.

2. The computer-implemented method of claim 1, wherein the deformed vertex positions are further determined based on at least one selected from the following: a position constraint on one or more vertices fixing the vertex position of each vertex of the one or more vertices; and an affine constraint on one or more vertices.

3. The computer-implemented method of claim 1, wherein the regularization term is further based on a barycentric vertex area for each vertex.

4. The computer-implemented method of claim 1, wherein the regularization term comprises a quadratic function of vertex position change for each vertex having a vertex position change below the threshold, wherein the quadratic function comprises coefficients based on the threshold and a slope factor controlling a slope of the quadratic function.

5. The computer-implemented method of claim 4, wherein the method further comprises:
receiving user input setting at least one of the threshold and the slope factor.

6. The computer-implemented method of claim 1, wherein the energy function is minimized using a three-block alternating direction method of multipliers comprising iteratively:
performing a first local step solving for the elastic energy term;
performing a second local step solving for the regularization term; and
performing a global step to determine an updated vertex position for each vertex based on the elastic energy term from the first local step and the regularization term from the second local step.

7. A computer system comprising:
one or more processors; and
one or more computer storage media storing computer-useable instructions that, when used by the one or more processors, causes the one or more processors to perform operations comprising:
receiving a shape comprising a plurality of vertices, each vertex having a vertex position;
receiving input to deform the shape;
based on the input, determining deformed vertex positions for the plurality of vertices by minimizing an energy function that includes an elastic energy term and a regularization term, the regularization term comprising a function of vertex position change for each vertex having a vertex position change below a threshold and a constant for each vertex having a vertex position change above the threshold, wherein the energy function is minimized using a three-block alternating direction method of multipliers by iteratively:
performing a first local step solving for the elastic energy term,
performing a second local step solving for the regularization term, and
performing a global step to determine an updated vertex position for each vertex based on the elastic energy term from the first local step and the regularization term from the second local step; and
generating a deformed shape based on the deformed vertex positions.

8. The computer system of claim 7, wherein the deformed vertex positions are further determined based on at least one selected from the following: a position constraint on one or more vertices fixing the vertex position of each vertex of the one or more vertices; and an affine constraint on one or more vertices.

9. The computer system of claim 7, wherein the regularization term is further based on a barycentric vertex area for each vertex.

10. The computer system of claim 7, wherein the regularization term comprises a quadratic function of vertex position change for each vertex having a vertex position change below the threshold, wherein the quadratic function comprises coefficients based on the threshold and a slope factor controlling a slope of the quadratic function.

11. The computer system of claim 10, wherein receiving the input to deform the shape comprises:
receiving user input setting at least one of the threshold and the slope factor.

12. One or more computer storage media storing computer-useable instructions that, when used by a computing device, cause the computing device to perform operations, the operations comprising:
receiving input to deform a shape, the shape comprising a plurality of vertices, each vertex having a vertex position;
based on the input, determining deformed vertex positions for the plurality of vertices by minimizing an energy function that includes an elastic energy term and a regularization term that is a function of vertex position change for each vertex having a vertex position change below a threshold and a constant for each vertex having a vertex position change above the threshold; and
generating a deformed shape based on the deformed vertex positions.

13. The one or more computer storage media of claim 12, wherein receiving the input to deform the shape comprises:
receiving a position constraint on one or more vertices fixing the vertex position of each vertex of the one or more vertices.

14. The one or more computer storage media of claim 12, wherein receiving the input to deform the shape comprises:
receiving an affine constraint on one or more vertices.

15. The one or more computer storage media of claim 12, wherein receiving the input to deform the shape comprises:
receiving user input via a control handle moving one or more vertices.

16. The one or more computer storage media of claim 12, wherein the regularization term comprises a quadratic function of vertex position change for each vertex having a vertex position change below the threshold.

17. The one or more computer storage media of claim 16, wherein the quadratic function comprises coefficients based on the threshold and a slope factor controlling a slope of the quadratic function.

18. The one or more computer storage media of claim 17, wherein receiving the input to deform the shape comprises:
receiving user input setting at least one of the threshold and the slope factor.

19. The one or more computer storage media of claim 12, wherein the regularization term is further based on a barycentric vertex area for each vertex.

20. The one or more computer storage media of claim 12, wherein the energy function is minimized using a three-block alternating direction method of multipliers comprising iteratively:

performing a first local step solving for the elastic energy term;

performing a second local step solving for the regularization term; and performing a global step to determine an updated vertex position for each vertex based on the elastic energy term from the first local step and the regularization term from the second local step.

* * * * *